2 Sheets—Sheet 1.
G. R. EVANS & W. P. PRESCOTT.
Shaft Furnaces for Smelting Tailing and Condensing Mercury.
No. 198,283. Patented Dec. 18, 1877.
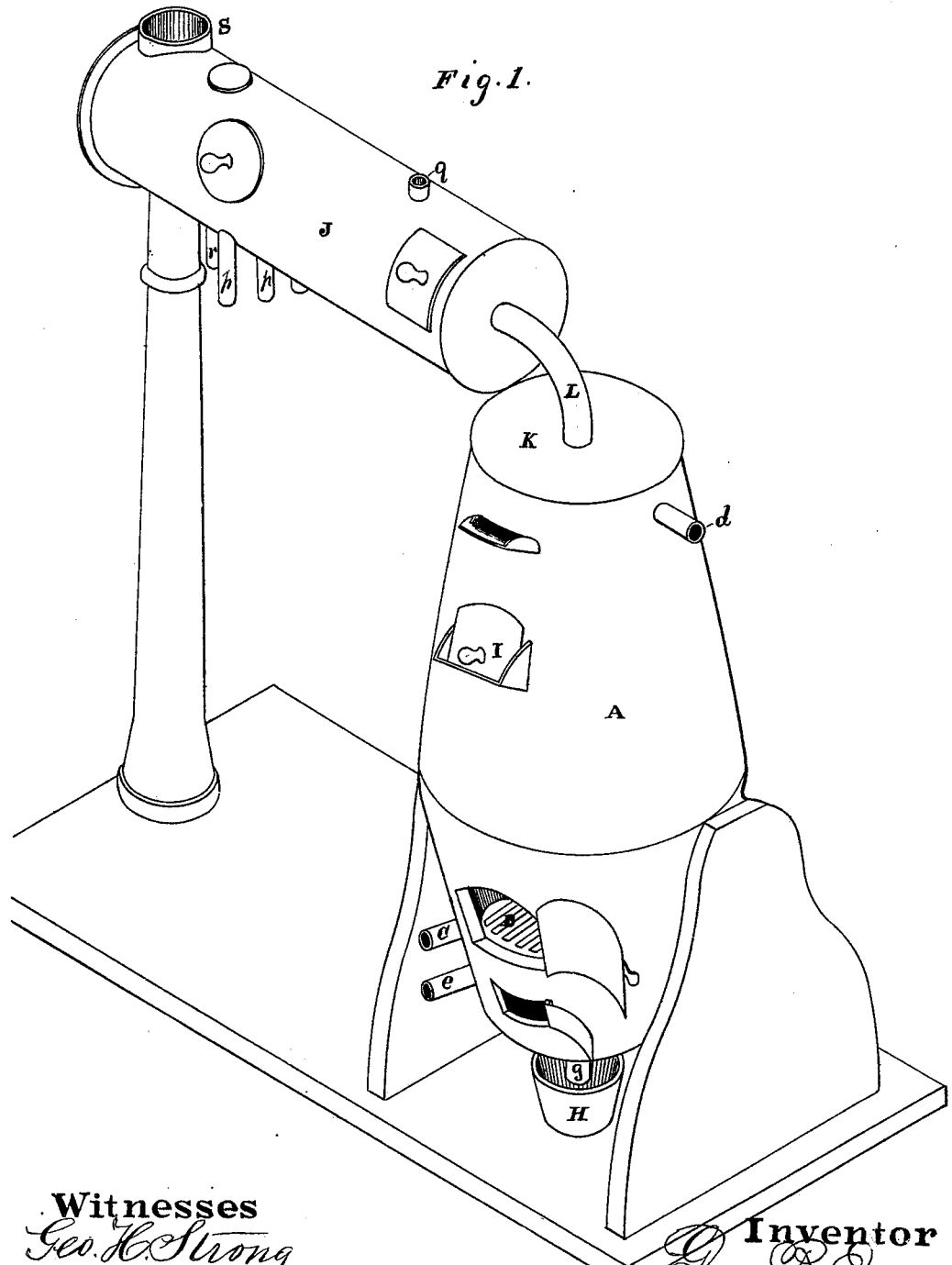

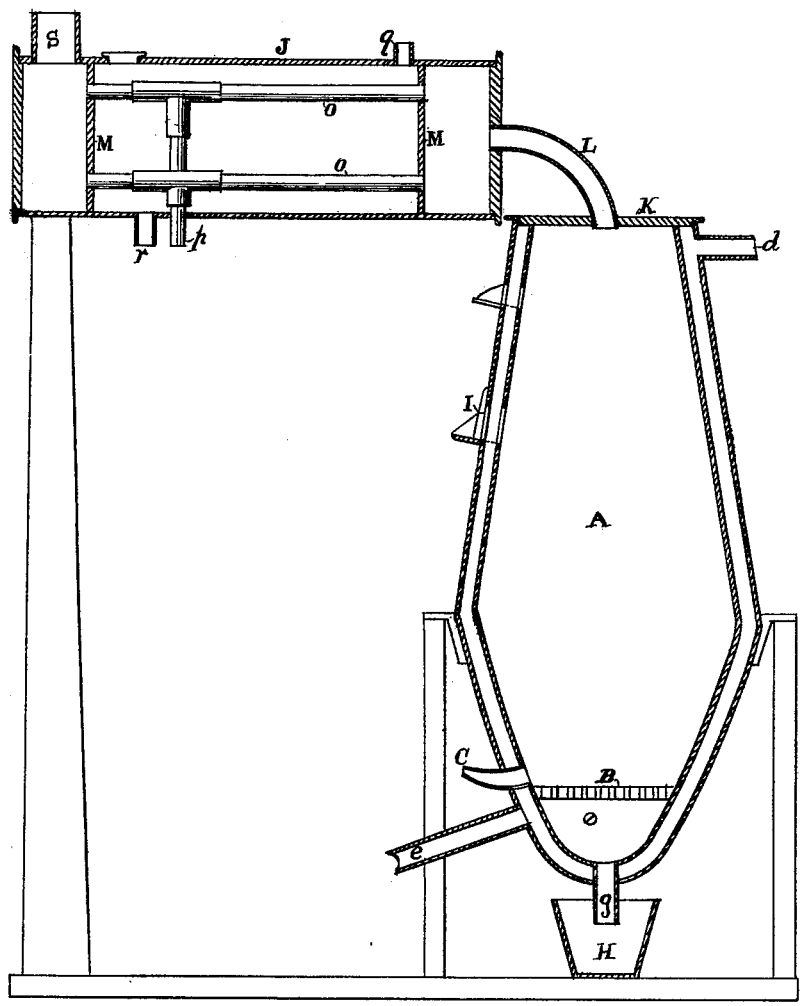

UNITED STATES PATENT OFFICE.

GEORGE R. EVANS AND WILLIAM P. PRESCOTT, OF CARSON CITY, NEVADA.

IMPROVEMENT IN SHAFT-FURNACES FOR SMELTING TAILINGS AND CONDENSING MERCURY.

Specification forming part of Letters Patent No. 198,283, dated December 18, 1877; application filed May 16, 1877.

*To all whom it may concern:*

Be it known that we, GEORGE R. EVANS and WILLIAM P. PRESCOTT, of Carson City, county of Ormsby, and State of Nevada, have invented an Improved Smelting-Furnace and Condenser; and we do hereby declare the following to be a full, clear, and exact description thereof, reference being had to the accompanying drawings.

Our invention relates to certain improvements in upright or stack furnaces, by which we adapt them for smelting fine ores or tailings by one process, and also to a novel condensing apparatus which we combine with the furnace for the purpose of arresting and saving any quicksilver that may become volatilized in the furnace and attempt to escape with the draft.

In order to more fully explain our invention, reference is had to the accompanying drawings.

Let A represent an upright or stack furnace, the interior of which is lined with fire-brick or other fire-resisting material, and the body of which is made double, so as to form a water-jacket entirely around the furnace, into which a constant circulation of water is maintained through the pipe d at its top and the pipe e near its bottom.

The body of the furnace can be made in any desired shape; but we prefer to make it in the form of a double cone, as represented, because that form is better adapted to give a large fire-surface, and a concentration of the ascending volume of heat as it rises toward the top of the stack.

The fire-grate B is placed inside of the furnace, near its bottom, so as to leave a suitable ash-pit below it. C is the tuyere-pipes, through which the usual air-blast is directed upon the fire on the grate. A passage leads downward from the center of the ash-pit through a short vertical pipe, g, at the lower end of the furnace, and conveys the melted metal into a pot or crucible, H. The door I, through which fuel is supplied to the furnace, is located at a considerable point above the grate, so that when the fuel is introduced it will fall upon the burning fuel on the grate.

J is a large cylinder, which is mounted horizontally upon a suitable support, opposite the upper end of the furnace. This cylinder serves both as a flue and condenser, as will be hereinafter more fully described.

The top of the furnace A we close tightly by means of a cover, K, from the center of which a curved pipe, L, leads into the end of the cylinder J, and serves to conduct any fumes which may be generated in the furnace, together with the products of combustion from the furnace, into the cylinder.

Each end of the cylinder J is closed by a head similar to a boiler-head, and the pipe L leads from the center of the top K of the furnace and enters the center of the cylinder-head. Inside of the cylinder J we secure two partition plates or flue-sheets, M M, one near each end of the cylinder, thus dividing the interior of the cylinder into three compartments, the middle or intermediate one of which occupies a greater portion of the length of the cylinder. The sheets M M we connect, by means of one or more flues or pipes, O, which pass through the middle compartment, but communicate with the end chambers as represented. A vertical pipe, p, extends up through the bottom of the cylinder J, and is connected to each of the flues O by a T-coupling. Water is admitted into the middle compartment through the pipe q, above one end of the middle compartment, and is allowed to escape through a pipe, r, at the bottom of the cylinder, near the opposite end of the compartment, so that when the furnace is in operation a continuous circulation of cold water can be kept up through the chamber, for the purpose of condensing the fumes which attempt to pass through the flues O. S is the smoke-stack or draft-pipe, and is connected with the outer compartment of the cylinder J.

Our improved process of smelting fine ore and tailings consists in feeding them into the upright or stack furnace at some point near its upper end, and allowing them to fall through the upward-ascending flame and heat and drop upon the burning fuel on the fire-grate. To this end, therefore, we construct the feed-opening at I, near the top and on one side of the furnace. The fuel, as above mentioned, may be carried up by an elevator, or any other desirable means, and is fed through the door I, and falls upon the grate B, while the blast from the tuyere C creates an intense heat inside of the furnace. As the heat and products of combustion rise upward toward the curved flue L, the fine ore or tailings is showered, by means of an automatic feeder, through the opening I, and descends through the upward-rising heat until it falls upon the burning fuel, where the metallic portion soon becomes smelted, and runs off through the short pipe $g$ into the pot or crucible H.

In smelting pulverized or fine ore the condensing attachment need not be used, unless the ore contains some metal which gives off metallic vapors that it is desired to recover; but the chief use of the condenser is when tailings are being smelted. Tailings almost always contain a large percentage of quicksilver that escaped in the original treatment of the ore from which they are derived, and it is important to save this metal. Therefore, when the fumes from the tailings pass through the curved pipe L they enter the first chamber of the cylinder. This chamber is a dust-chamber, where all that portion of fine ore whose specific gravity has not been sufficient to carry it downward against the upward draft, will settle and be caught. The lighter and more volatile portion, together with the metallic fumes and products of combustion, will pass through the flues O. These flues, being surrounded by cold water, the instant the metallic vapors enter them they will be condensed and precipitated, and the gravity of the particles will cause them to flow downward through the vertical pipes $p$ into a receptacle prepared to receive it, while the products of combustion pass on through the smoke-stack S into the open air.

By this means we are able to smelt fine ore and tailings without preliminary preparation. The fine ore, falling through the upward-ascending draft and heat, becomes thoroughly oxidized, so that by the time it strikes the burning fuel it is ready to part with its metals, while the previous oxidation of the base metals will avoid any liability of its slagging.

In treating tailings, we prefer to subject them to a concentrating process before submitting them to the smelting process, as we can thus get rid of a large proportion of the worthless stuff; but this preliminary treatment is not a necessity.

Having thus described our invention, what we claim, and desire to secure by Letters Patent, is—

1. The upright or shaft furnace A, having the fire-grate B near its bottom, and provided with a vertical draw-off pipe, $g$, extending from the ash-pit at its lower end, so as to conduct the metal from the ash-pit into a pot or crucible, H, substantially as above described.

2. The upright or shaft furnace A, in combination with the tight cover K, horizontal condenser J, consisting of three compartments mounted opposite the upper end of the furnace, and connecting-pipe L, said furnace being provided with the side opening I in its side near the top, substantially as and for the purpose described.

3. The condensing-cylinder J, mounted opposite the upper end of the furnace, and divided into three compartments, the two end compartments serving as dust-chambers, connected by flues O O, which pass through the middle compartments, in combination with the vertical pipes $p$, furnace A, and connecting-pipe L, substantially as and for the purpose described.

In witness whereof we have hereunto set our hands and seals.

GEORGE R. EVANS. [L. S.]
WILLIAM PENN PRESCOTT. [L. S.]

Witnesses:
C. S. MOTT,
G. L. M. COMSTOCK.